United States Patent
Su (10) Patent No.: US 9,361,438 B2
(45) Date of Patent: Jun. 7, 2016

(54) SYSTEM AND METHOD FOR ACCEPTING USER INPUT USING ASYNCHRONOUS AUTHENTICATION

(71) Applicant: Xiaoqiang Su, Fremont, CA (US)

(72) Inventor: Xiaoqiang Su, Fremont, CA (US)

( * ) Notice: Subject to any disclaimer, the term of this patent is extended or adjusted under 35 U.S.C. 154(b) by 90 days.

(21) Appl. No.: 13/974,043

(22) Filed: Aug. 22, 2013

(65) Prior Publication Data
US 2015/0058945 A1    Feb. 26, 2015

(51) Int. Cl.
*G06F 21/31* (2013.01)
*G06F 21/33* (2013.01)
*H04L 29/06* (2006.01)
*H04W 12/06* (2009.01)

(52) U.S. Cl.
CPC .............. *G06F 21/31* (2013.01); *G06F 21/33* (2013.01); *H04L 63/168* (2013.01); *H04W 12/06* (2013.01)

(58) Field of Classification Search
CPC .................................................... H04W 12/06
USPC ............................................................ 726/7
See application file for complete search history.

(56) References Cited

U.S. PATENT DOCUMENTS

| | | | |
|---|---|---|---|
| 7,225,462 B2 | 5/2007 | Bass | |
| 8,327,142 B2 | 12/2012 | Lund | |
| 8,452,980 B1 | 5/2013 | Black | |
| 8,478,989 B2 | 7/2013 | Lynch | |
| 2005/0120224 A1 | 6/2005 | Murakami | |
| 2006/0178951 A1* | 8/2006 | Rund, III | G06Q 10/0836 705/7.35 |
| 2008/0250081 A1* | 10/2008 | Itogawa | G06F 17/30882 |
| 2009/0043789 A1* | 2/2009 | Gupta | G06F 17/30029 |
| 2009/0070230 A1* | 3/2009 | Silverstein | G06Q 20/04 705/26.1 |
| 2014/0026203 A1* | 1/2014 | Ho | H04L 63/08 726/9 |

OTHER PUBLICATIONS http://en.wikipedia.org/wiki/Bookmarklet.

* cited by examiner

*Primary Examiner* — Andrew Nalven
*Assistant Examiner* — Khang Do (57) ABSTRACT

A method and system for accepting user inputs over a network. The user is provided with an input widget on a client system to collect and send an input and user identity information to a server system, without the requirement to authenticate the user identity on the client system upfront. The server stores the user input and the user identity information, and associates the user input information with the user identity information. The server system sends to the user identity URL a message comprising of the user input information and an indication of action such as a link that the user is to perform to confirm the authenticity of the input. In response to the indicated action being performed, the server system processes the user input as authenticated input.

5 Claims, 12 Drawing Sheets

Thank you for submitting your comment. You will receive a message at yourid@xyz.com to confirm its authenticity.

...(greetings)

Please click the link to confirm you made the comment on [some web page url] as below:

"Nice proposal. Hard to find a better solution."

Or, click here to report it as an error.

Input Authentication Table 203 input_id: "123456"
associating_page: "http://example.com/a/20120723/move-to-nosql"
userid_url: "su9204@hotmail.com"
input_context: {field1: "Nice proposal. Hard to find a better solution."}
input_submission_time: "07/25/2012 09:30:01 PDT"
authenticity_confirmed_time: NULL
authenticity_denied_time: NULL

...
Please confirm the following actions posted to your account:
(Yes)(No) Add note on 07/29/212 8:30AM:
         "Need to buy new tooth paste."  ⎫
         ☑ Keep it private               ⎬ 440
                                         ⎭
450
460 (Yes)(No) Add note on 07/29/2012 2:10PM:
         "The Old Faithful Geyser. Truly Amazing."
         [Picture 1] [Picture 2]
         ☑ Keep it private

Public updates:

...

(previous authenticated public notes)

XSU on 07/29/2012 02:10PM:
"The Old Faithful Geyser. Truly Amazing."
[Picture 1] [Picture 2]

...

Private updates:

XSU on 07/28/2012 08:30AM:
Need to buy new toothpaste.

SYSTEM AND METHOD FOR ACCEPTING USER INPUT USING ASYNCHRONOUS AUTHENTICATION

CROSS-REFERENCE TO RELATED APPLICATIONS

This application relates to and claims the benefit of U.S. Provisional Patent Application No. 61/692,683 filed Aug. 23, 2012.

STATEMENT REGARDING FEDERALLY SPONSORED RESEARCH OR DEVELOPMENT

Not applicable.

TECHNICAL FIELD

The present invention generally relates to systems and methods for accepting user inputs over a network. More specifically, the present invention relates to systems and methods for accepting user inputs by authenticating a user input asynchronously.

BACKGROUND OF THE INVENTION

Many on-line or web-base applications or services such as a blog post box, a comment box, a TODO list, a virtual pin board or a social bookmarking service rely on user inputs as part of the services. In may situations, anonymous inputs is not possible or allowed. That is, a user is required to provide identity information and have identity information authenticated before such input can be submitted or accepted. The user may be required to have had registered an account with the application or service, and be authenticated by logging in with the user identity and credential information such as username and password associated with the account. Or, the user may get authenticated through a third-party authentication service provider or a secondary system (e.g., OpenID provider) by making service calls to the third party authentication provider or the secondary system using the user's identity and credential information associated with the third-party authentication provider.

Such methods and systems of prior arts requiring upfront authentication steps prior to the submission of inputs can be problematic for a couple of reasons. First, the added overhead of extra steps of authentication and waiting for response from authentication not only cuts into the user-application interaction flow, but also can be cumbersome for users, especially when only a few mouse clicks or a few words of typing are generally involved in an input request to an on-line application or service (e.g., an on-line virtual pin board or a social bookmarking service). Some applications or services may choose the approach of authenticated once, and reuse the authentication in subsequent input requests until the session expires or the user logout. This approach still does not reduce the overhead much when the user input requests are no more than a couple times during the authenticated session. In addition, keeping the authenticated session longer time can increase risk of the user account security, especially when a user is using a public computer, a persistent login method or session for input purpose may subject the user account to unauthorized access. Furthermore, there are security and privacy concerns when employing third-party authentication and the user has to share or transmit the user's third-party account information.

SUMMARY OF THE INVENTION

An embodiment of the present invention provides a method and system for accepting user inputs over a network. The user is provided with an input widget on a client system (e.g., a web browser) to collect and send a user input and user identity URL information to a server system, without the requirement to authenticate the user identity URL on the client system upfront. The server stores the user input and the user identity URL information, and associates the user input information with the user identity URL information. The server system sends to the user identity URL a message comprising of the user input information and an indication of action such as a link that the user is to perform to confirm the authenticity of the input. In response to the indicated action being performed, the server system processes the user input (e.g., add a new comment to an article) as authenticated input.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION OF THE INVENTION

The present invention provides a method and system for accepting user inputs over a network using asynchronous authentication. It is among the primary objects of the present invention to reduce the number of steps to submit a user input on a web page. It is another object of the present invention to reduce transmission of sensitive information or avoid requesting sensitive information from third-authentication in an on-line application or service. In one embodiment, the user is provided with an input widget on a client system (e.g., a web browser) to collect and send a user input and user identity URL information to a server system, without the requirement to authenticate the user identity URL on the client system upfront. The server stores the user input and the user identity URL information, and associates the user input information with the user identity URL information. The server system sends to the user identity URL a message comprising of the user input information and an indication of action such as a link that the user is to perform to confirm the authenticity of the input. In response to the indicated action being performed, the server system processes the user input (e.g., add a new comment to an article) as authenticated input.

Figure 1A:
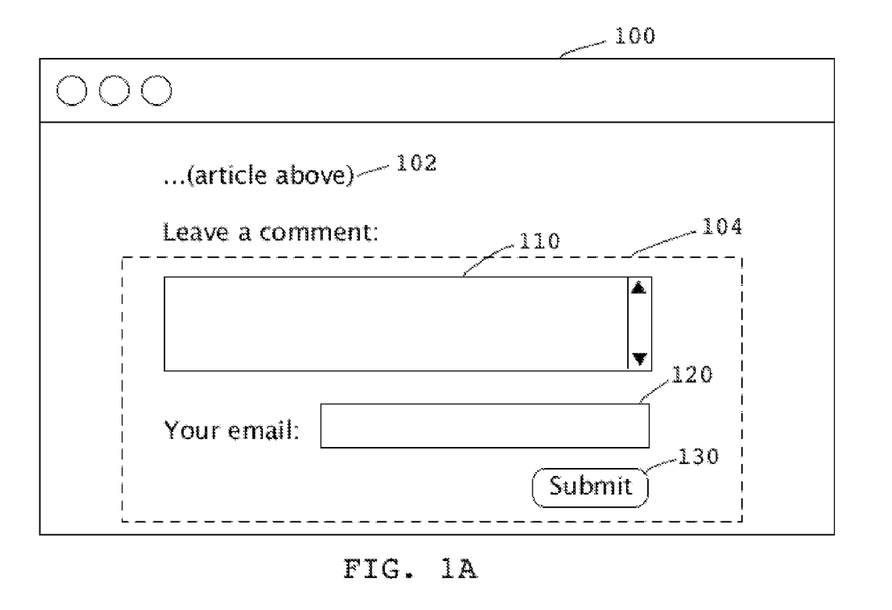
FIGS. 1A-1C illustrate an embodiment of the present invention in action.
Figure 1B:
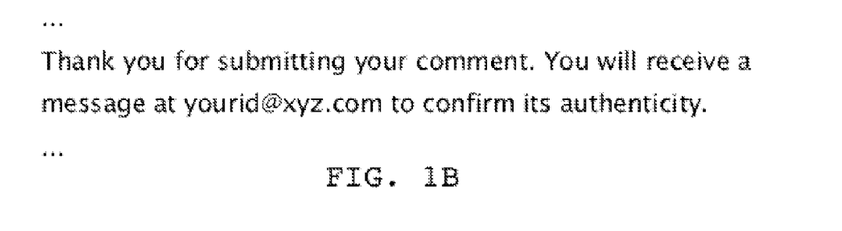
Figure 1C:
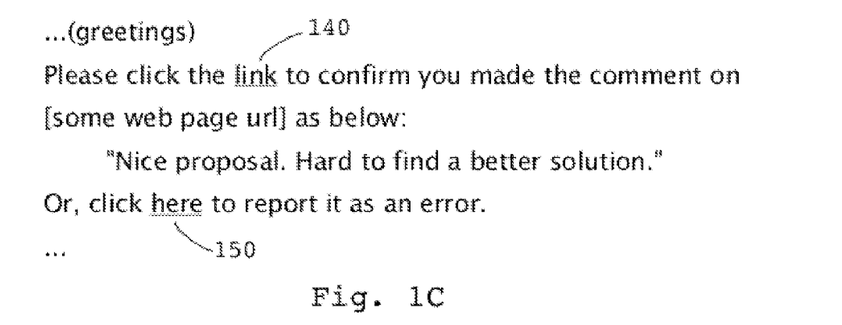

FIGS. 1A-1C illustrate an embodiment of the present invention in action.

FIG. 1A illustrates the display of a web page inside a client system such as a web browser 100. The web page contains an article 102 and an input widget 104, which is to collect a user input on the client system and communicate the input to the server system. The input widget 104 comprises of a first means 110 such as a text field for entering a user input (e.g., a comment), a second means 120 such as a text field for entering user identity URL (e.g., an email address), and an indication of action such as a submitting button 130 that the user is to perform to send the input entered in 110 and user identity URL entered in 120 to the server system. In one embodiment of the present invention, the user identity URL is a user email address. In another embodiment of the present invention the identity URL may be an account identifier of a user account registered with the server system. In this disclosure, a user input is refer to a collection of information that a user intents to associate with a user identity URL, not including the user identity URL. One skilled in the art would appreciate that the first means 110 for entering user input is not limited to a text field. It may be a clickable link or button, a text field, or a selections list, a check box, a field for file uploading, etc or a combination of different HTML input elements. It may even be reduced with the user input implied in an indication of action (e.g., a single button that the user can click to submit approval of an opinion expressed in the button label such as "Thumbs up!").

After the user perform the "submit" action by selecting the indication of action 130, the client system 100 sends the input entered in 110 and the user identity URL information entered in 120 to the server system. Since the authentication-first step is eliminated, the upfront interactions for the user with the on-line application or service is reduced. Furthermore, transmission of sensitive credential information for authenticating purpose or requesting share of sensitive information from third-party authentication provider are avoided.

After the server system receives the user input and the user identity URL information, the server system stores them into a database, and associates the user input with the user identity URL, and marks the user input authenticity as undetermined.

The server may optionally provide to the client system an acknowledgement message to acknowledge receipt of the user input. FIG. 1B illustrates an exemplary acknowledgement message that is to be displayed to a user according to one embodiment of the present invention.

The server system will generate authentication message that is to be delivered to the user identity URL to verify the authenticity of the user input. In one embodiment when the user identity URL is an email address, the server system may generate the authentication message after it stored the use input and user email address information and send the message to the user email address. In another embodiment when the user identity URL is an account identifier of an account registered with the server system, it may be preferable that the authentication message be generated and displayed to the user at a future time when the user logs in the account.

FIG. 1C illustrates an authentication message that is delivered to a user's identity URL according to one embodiment of the present invention. In this embodiment, the message contains at least part of the user input and an indication of action such as a link 140 that the user is to perform to confirm to the server system the authenticity of the user input. In response to the confirmation, the server system marks the user input as authenticated and processes the user input accordingly, e.g., includes a user input comment to an article web page. The authentication message may further contain an indication of action 150 that the user is to perform to indicate a denial to the server that the input is an invalid one. In response to such denial, the server will mark the input as authenticity denied and ignore the input or have the input removed from the database.

Figure 2A:
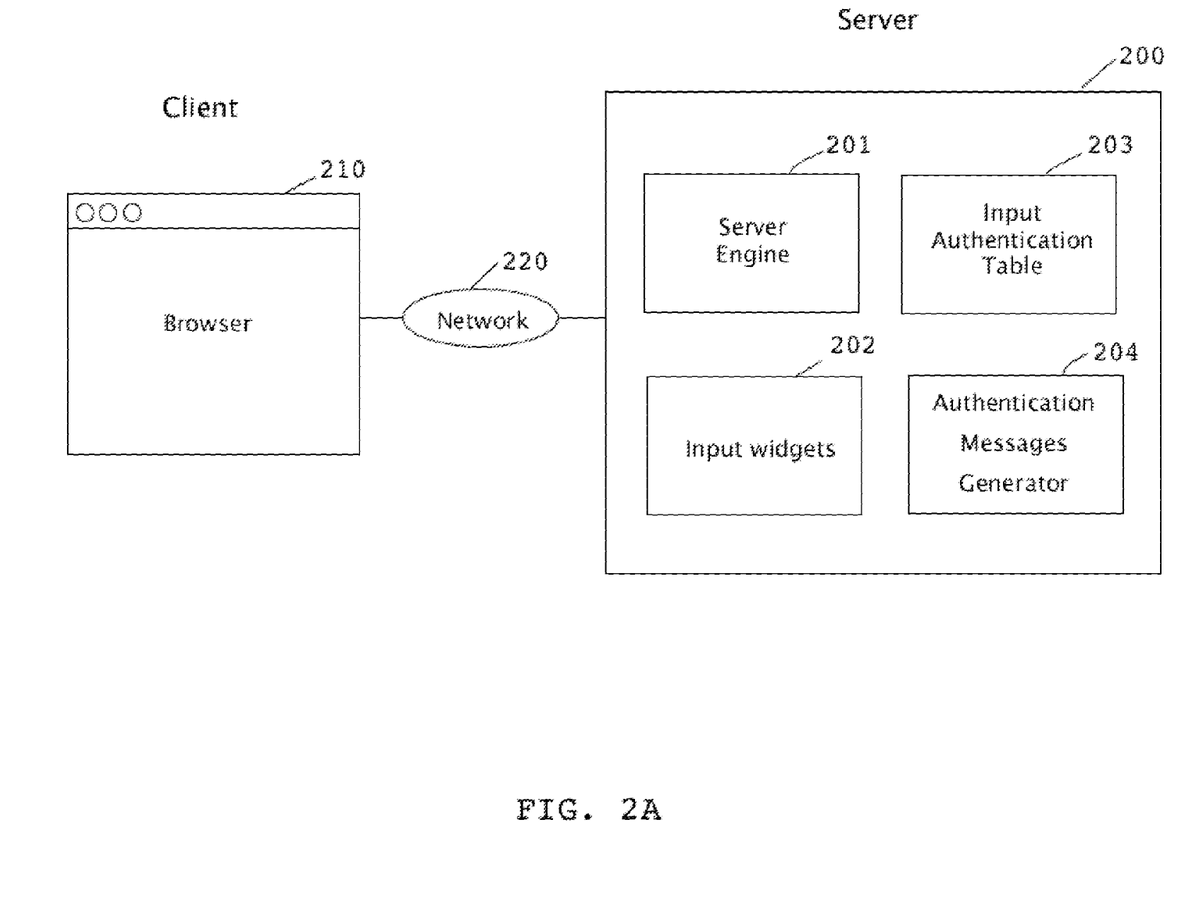
FIGS. 2A-2B are block diagrams illustrating an embodiment of the present invention.

FIG. 2A is block diagrams illustrating an embodiment of the present invention. This embodiment supports the asynchronous-authenticating input over a network. The server system 200 includes a server engine 201, input widgets 202, an input authentication table 203, and an authentication messages generator 204. The server engine 201 receives requests such as HTTP requests to provide input widgets 202 to various client systems, such as a web page identified by a web URL displayed through a web browser 210. The server system 200 and client system 210 communicate through a network such as the Internet 220. The authentication messages generator 204 generates authentication message that is to be delivered to the user identity URL and that the user is to respond to confirm authenticity of the user input. The server system 200 may further include a user database to allow users to register accounts and use user account identifiers as user identity URL.

Figure 2B:
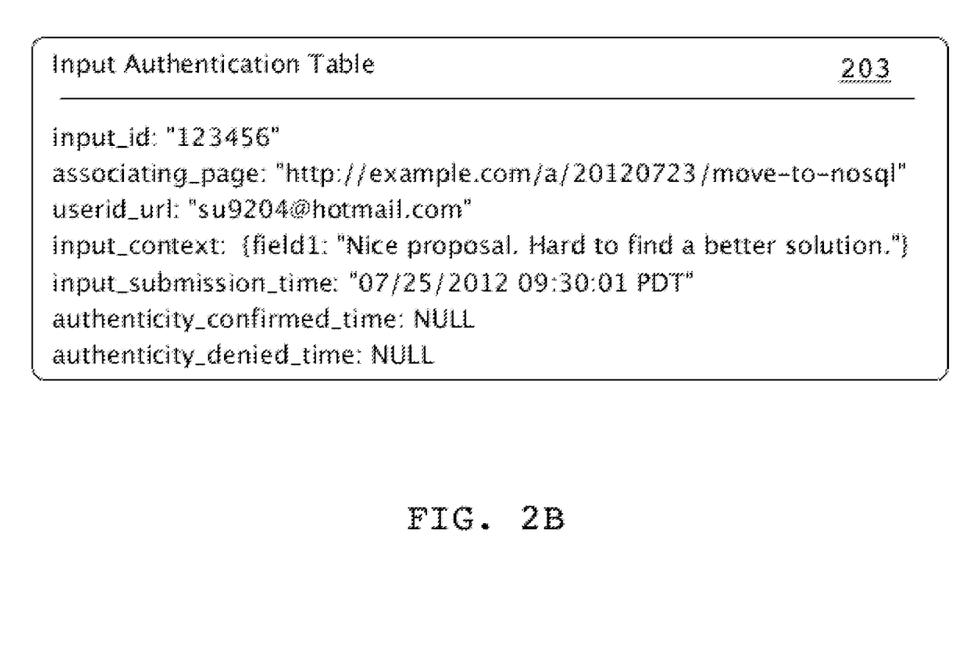

FIG. 2B illustrates an exemplary entry of the input authentication table. In this embodiment, the input authentication table contains an entry for each occurrence of user input submission, with information including input associating page URL, user identity URL, input context, input submission time, and input authenticity confirmation time and input authenticity denial time. Each input entry can only be associated with one user, while each user can have multiple inputs entries. In response to the confirmation of authenticity of a user input, the server engine may remove the entry from the input authentication table and add the information to a second input table that only includes authenticated user inputs.

Figure 3:
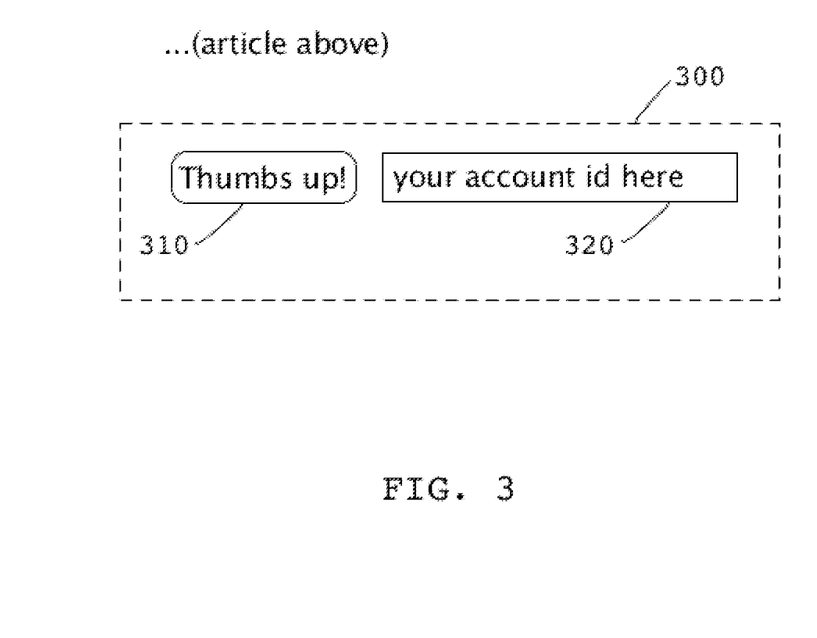
FIG. 3 illustrates another exemplary input widget according to one embodiment of the present invention.

FIG. 3 illustrates another exemplary input widget according to one embodiment of the present invention. In this embodiment, the input widget 300 contains a button 310 and a text field 320 to enter user identity URL. In this embodiment, button 310 is not only a means to submit the user input, but also an implicit field for user input. It will cause an input value implied by the button label such as "Thumbs up!" to be sent with the user identity URL to the server system.

Figure 4A:
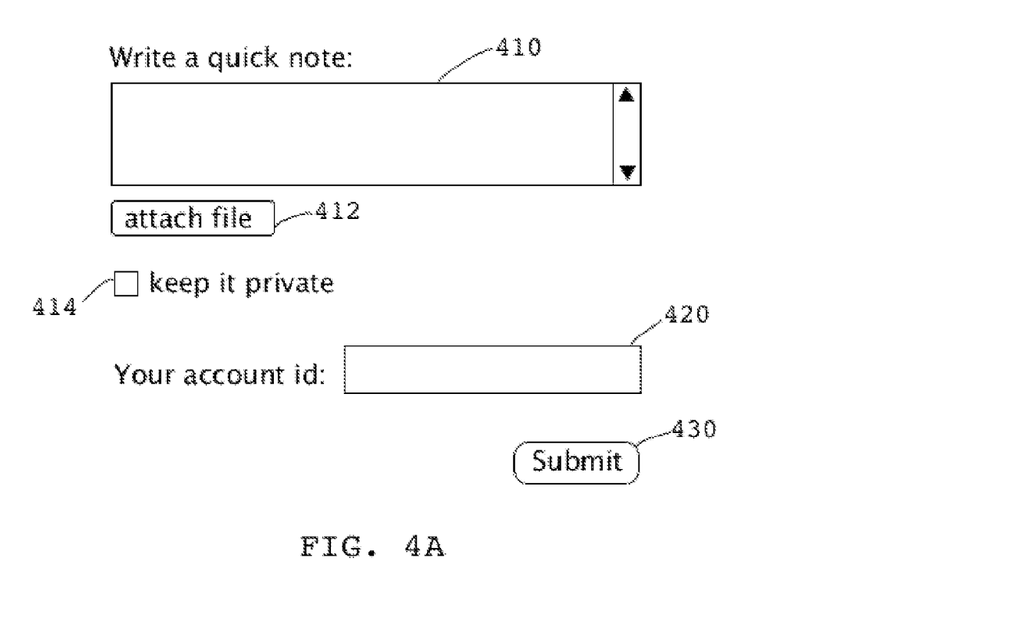
FIGS. 4A-4C illustrate another embodiment of the present invention in action.
Figure 4B:
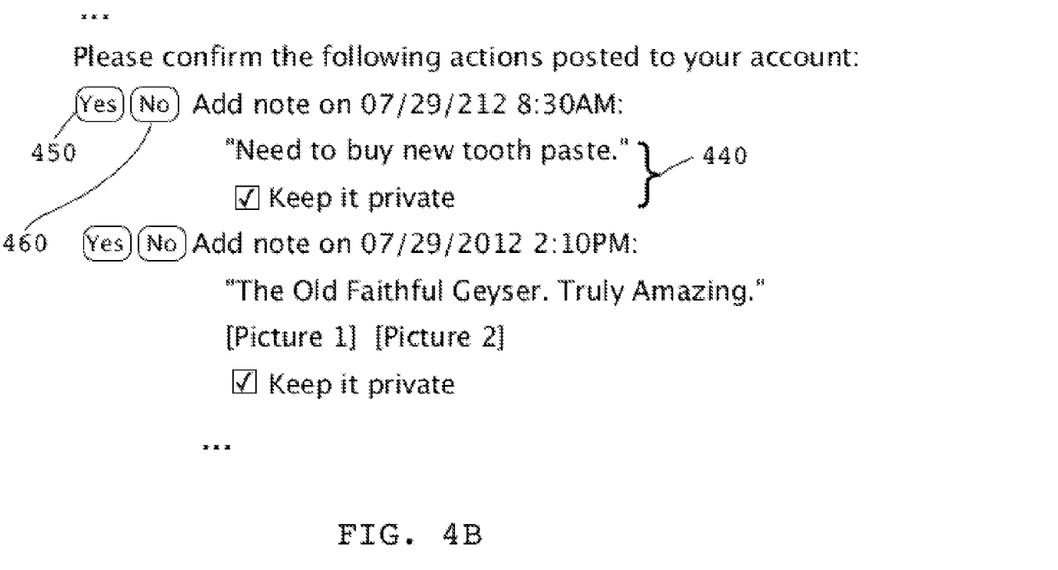
Figure 4C:
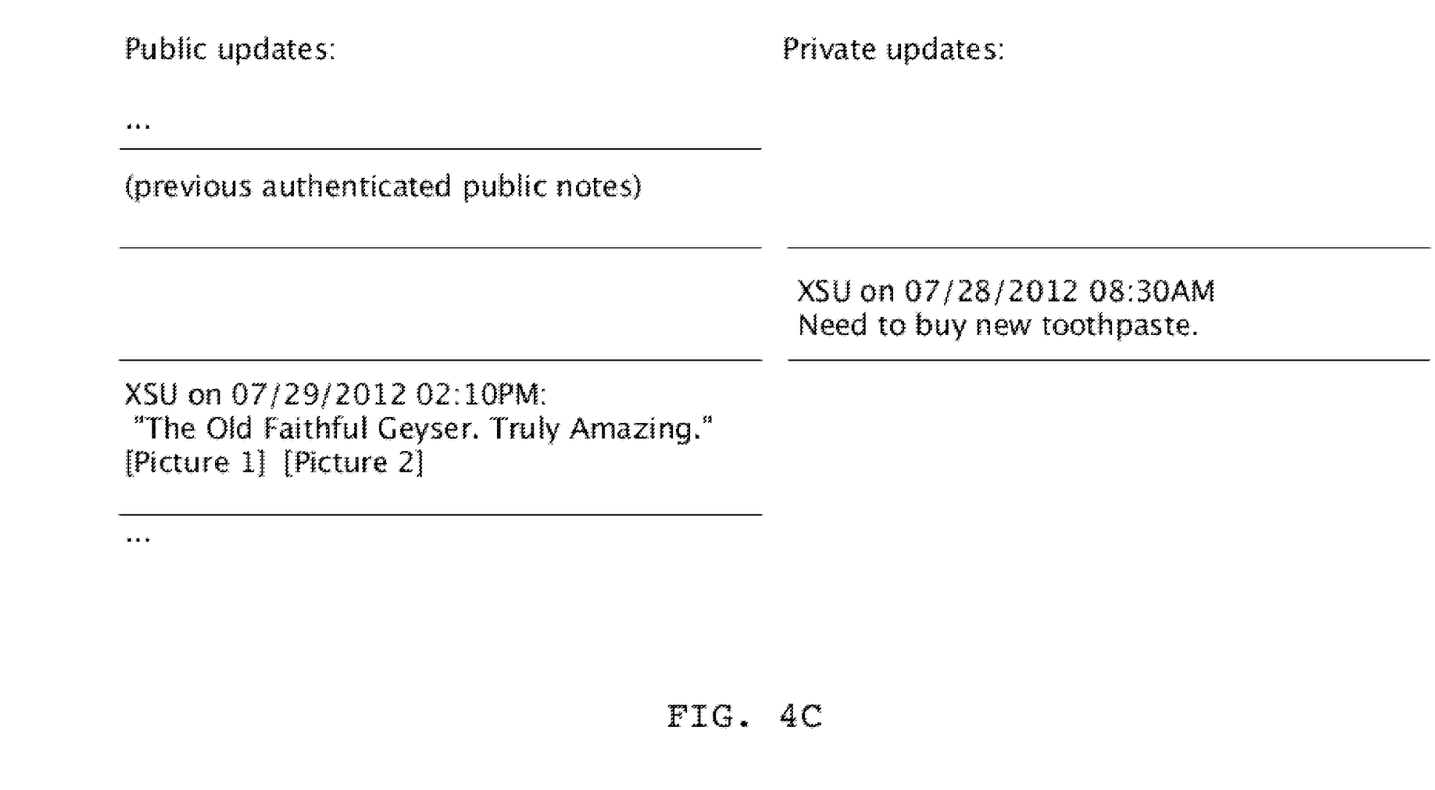

FIGS. 4A-4C illustrates another embodiment of the present invention in action. FIG. 4A illustrates an input widget according to one embodiment of the present invention. In this embodiment, the input widget comprises of multiple input elements, including a text field 410, a file attachment field 412, a check box field 414, and a text field 420 to enter user identity URL, and a submit button 430. In this embodiment, a user identity URL is an account identifier of a user account registered with the server system. FIG. 4B illustrates an authentication message that is delivered to the user identity URL (account identifier) which causes the display of the authentication message to a user when the user logs in the user account. In this embodiment, the authentication message may not be generated until the user logs in the user account, and multiple occurrences of user inputs authentications may be combined in one authentication message. For each occurrence of submitted inputs whose authenticity are undetermined, the authentication message will include an entry that contains at least part of the user input information 440, an indication of action such as a button 450 to confirm the authenticity of the user input, and optionally an indication of action such as a button 460 to deny the authenticity of the user input. In response to the indication of confirmation 450 being performed, the server system continues to process the user input as authenticated input. If the user instead selects 460 to deny the authenticity of an input, the server system will remove the input from the server database or ignore the input. FIG. 4C illustrates an exemplary display of authenticated user inputs after the server system processes user inputs in response to the user confirmation of the inputs authenticity.

Figure 5A:
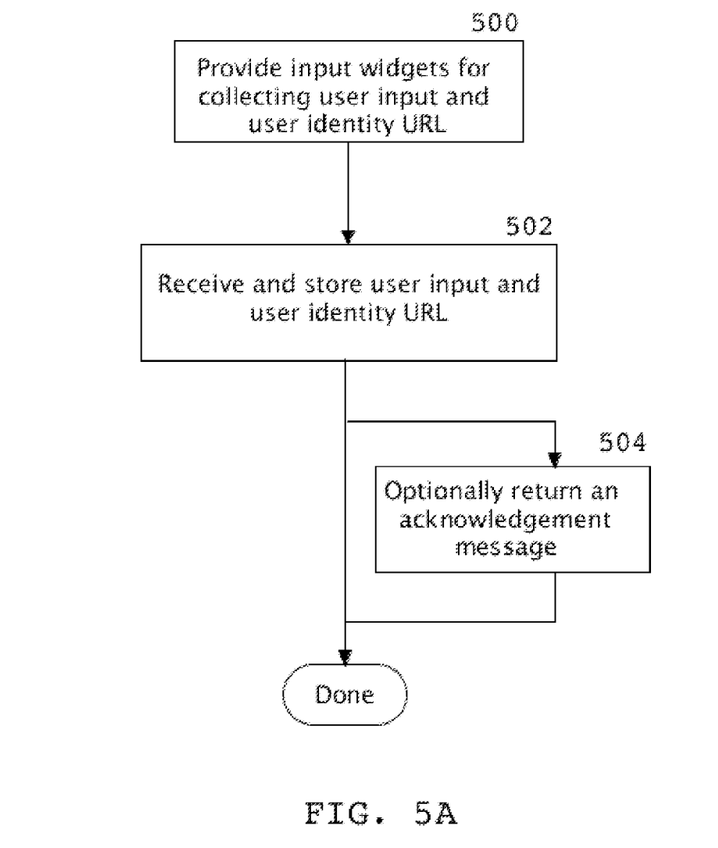
FIGS. 5A-5B are flow diagrams of a routine illustrating an embodiment of the present invention.
Figure 5B:
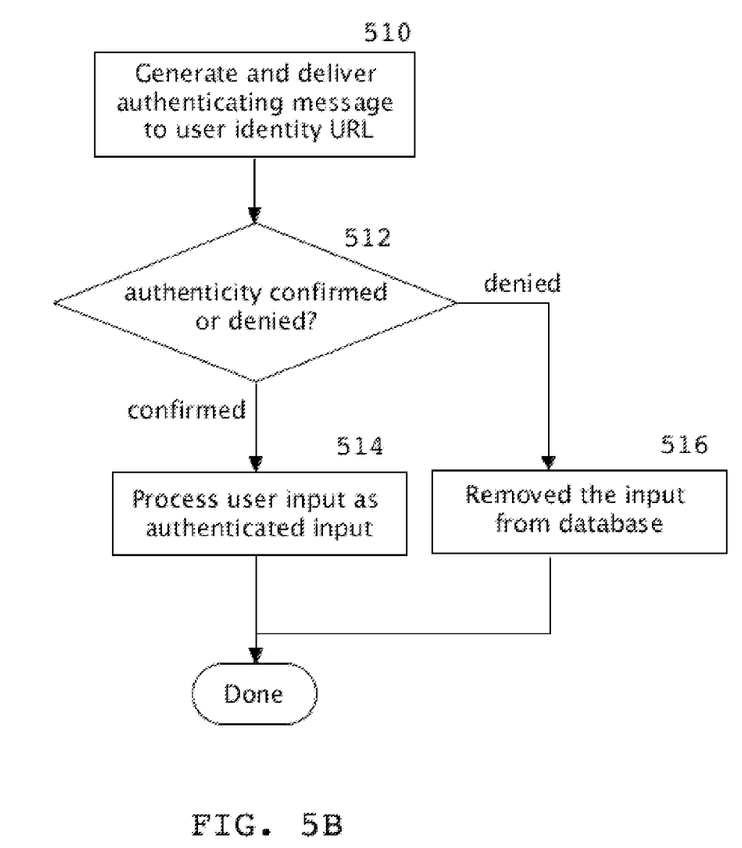

FIGS. 5A-5B are flow diagrams of a routine illustrating an embodiment of the present invention. FIG. 5A represents the first stage of a routine of accepting user inputs without the requirement to authenticate user upfront. In step 500, the server system sends the input widget (e.g., FIG. 1A) to the client system, and causes the client system to display the input widgets for collecting user input and user identity URL (e.g., an email address) that the client system is to send to the server system without the user identity URL being authenticated. In step 502, the server system receives and stores the user input and user identity URL information. The server system also associates the user input with the user identity URL such that each user input can be uniquely mapped to a user identity URL (e.g., FIG. 2B and establish a many-to-one relationship). In one embodiment, it completes immediately after step 502. In an alternative embodiment, the server system continues at step 504 after step 502 then completes. In step 504, the server system returns an acknowledgement message (e.g., FIG. 1B) acknowledging receipt of the information to the client system and cause the client system to display it to the user.

FIG. 5B represents the second stage of a routine of accepting user inputs using asynchronous authentication. In step 510, the server system generates and delivers an authenticating message to a user identity URL for a user to verify the authenticity of a user input. In step 512, if the user confirms the authenticity of the user input, the server system continues at step 514, else if the user denies the input authenticity, that is, the user regards the input should not be associated with the user identity URL, the server system continues at step 516. In step 514, the server system receives the confirmation and continues to process the user input as authenticated input then completes. In step 516, the server system receives the denial and removes the user input from the database and completes. If in step 512, the user ignores to decide the authenticity of an input, that is, neither confirm nor deny the input's authenticity, the system may take no further action and completes. However, the server system may periodically perform scanning on the input authentication table to check on inputs whose authenticity are undetermined, and may choose to remove from the table those entries whose submission time has past certain time limit (e.g. 60 days).

Figure 6A:
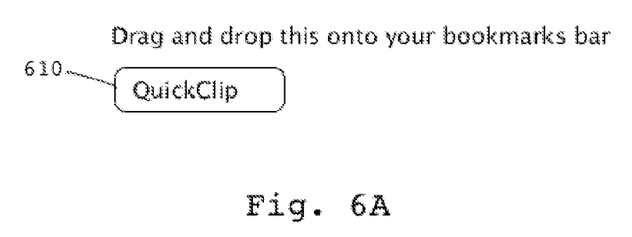
FIGS. 6A-6C illustrate yet another embodiment of the present invention in action.
Figure 6B:
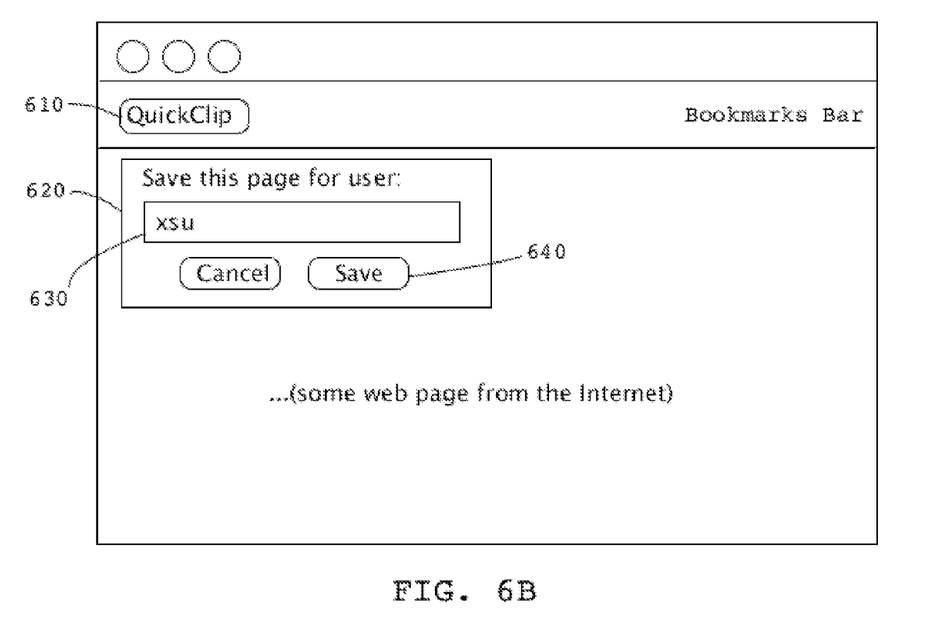
Figure 6C:
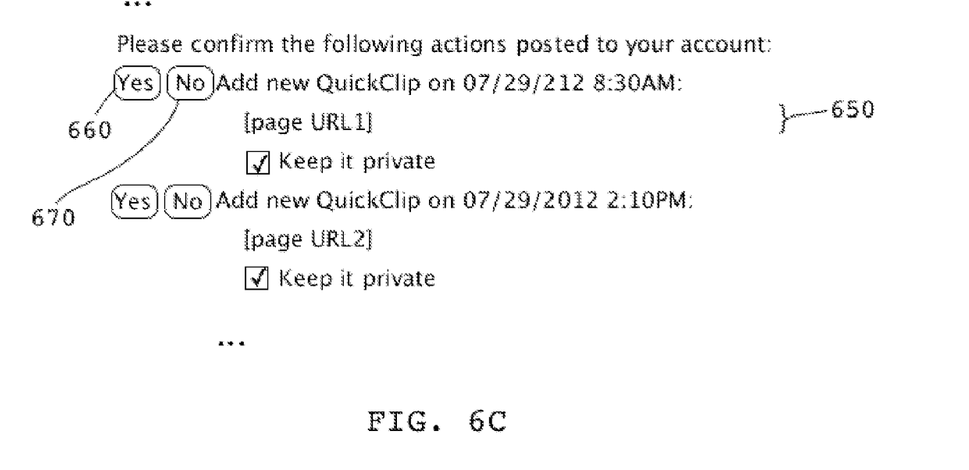

FIGS. 6A-6C illustrate yet another embodiment of the present invention in action. FIG. 6A illustrates creation of an input widget 610 (e.g., a bookmarklet as described in http://en.wikipedia.org/wiki/Bookmarklet). Each input widget 610 is assigned by the server system a globally unique identifier that uniquely identifies the input widget. In one embodiment, the server system (e.g., the server in FIG. 2A) further includes an input widget/user mapping table that maps an input widget to a unique user identity URL or none. If at the time when an input widget 610 is created and assigned a globally unique identifier, a user identity URL is provided to the server system (e.g., the user has had an account with the server system and is currently logged in), the server system will create a new mapping entry in the input widget/user mapping table that uniquely maps the input widget identifier to the user identity URL. The input widget is then provided to the user to be stored on the client system (e.g., on a bookmarks bar of a browser). The input widget identifier is stored on the client system as part of the input widget (e.g. as part of the book-marklet's URL destination field). For example, the follow pseudo code illustrates a bookmarklet's URL storing a global unique identifier:

```
<a href="javascript: (function( ) {
    var s = document.createElement('script');
    s.src = 'http://www.example.com/js/quickclip.js';
    document.body.appendChild(s);
    var widget_id = '9KP1FcD7QHHJ1X5L';
    ...
    var user_id = determineUserId(widget_id);
    ...
})( );">QuickClip</a>
```

Once the input widget is stored on the client system, there will be no need to send new requests for provision of this input widget from the server system every time a user is to use it.

Regarding the input widget identifier, in an alternative embodiment other than using a input widget/user mapping table, a ruled-based identifier can be generated and assigned such that the user identity URL can be derived from the identifier based solely on a rule without a need for lookup in a mapping table. For example, if an identifier is generated by joining a user identity URL such as an account identifier, a special character that is reserved exclusively as separator, and a few more random alphabets and numbers, then the rule to derive the user identity URL is to get a sub-string of the input widget identifier that starts at the first character and ends before the special character of the identifier.

FIG. 6B illustrates the input widget of FIG. 6A in action according to one embodiment of the present invention. The input widget 610 is available on the bookmarks bar of a web browser on a client system that a user is to select to perform an action of input defined by the input widget (e.g., to record URL information of a web page being currently viewed; in another example, the action of input defined by the input widget is to display a blank text area for the user to record a quick note). In response to the input widget being selected, the client system collects the inferred user input (e.g., the URL information of the web page being currently viewed). At the same time or in a sequential manner, a request containing the input widget identifier information is sent to the server, requesting to derive a user identity URL from the input widget identifier. In response to the request, the server system looks up the input widget/user mapping table according to the input widget identifier. If the server system successfully derives a unique user identity URL from the input widget identifier, the server system sends a message preferably containing the derived user identity URL information back to the client system, indicating a successful mapping. Otherwise, the server system sends a message to the client system, indicating a failure to derive a user identity URL. The client system is further instructed to display a new input widget 620 containing at least a text field 630 for entering user identity URL and an indication of action 640 that the user is to perform to send server system the collected information including the inferred user input and user identity URL. If a user identity URL was successfully derived and returned from the server system, the text field 630 for entering user identity URL in the new input widget 620 may be pre-populated with the value of the derived user identity URL. The new input widget 620 may further include additional input elements to collect additional information. In response to the user performing the act of submission on button 640, the client system sends the server system a message containing information of the user input including the inferred user input, user identity URL and the identifier of input widget 610. The server continues the routine to accept the user input using asynchronous authentication method as disclosed in the present invention.

Regarding deriving a user identity URL, in an alternative embodiment, if the input widget identifier is a rule-based identifier from which the client system may be able to derive a user identity URL, the client system may not need to send a mapping request to the server system.

FIG. 6C illustrates an authentication message that is delivered to a user account, which causes the display of the authentication message to the user when the user logs in the user account according to one embodiment of the present invention. In this embodiment, multiple user inputs authentications are combined in one authentication message. For each occurrence of submitted inputs whose authenticity have not been determined, the authentication message will include an entry that contains at least part of the user input information 650, an indication of action such as a button 660 to confirm the authenticity of the user input, and optionally an indication of action such as a button 670 to deny the authenticity of the user input.

Figure 6D:
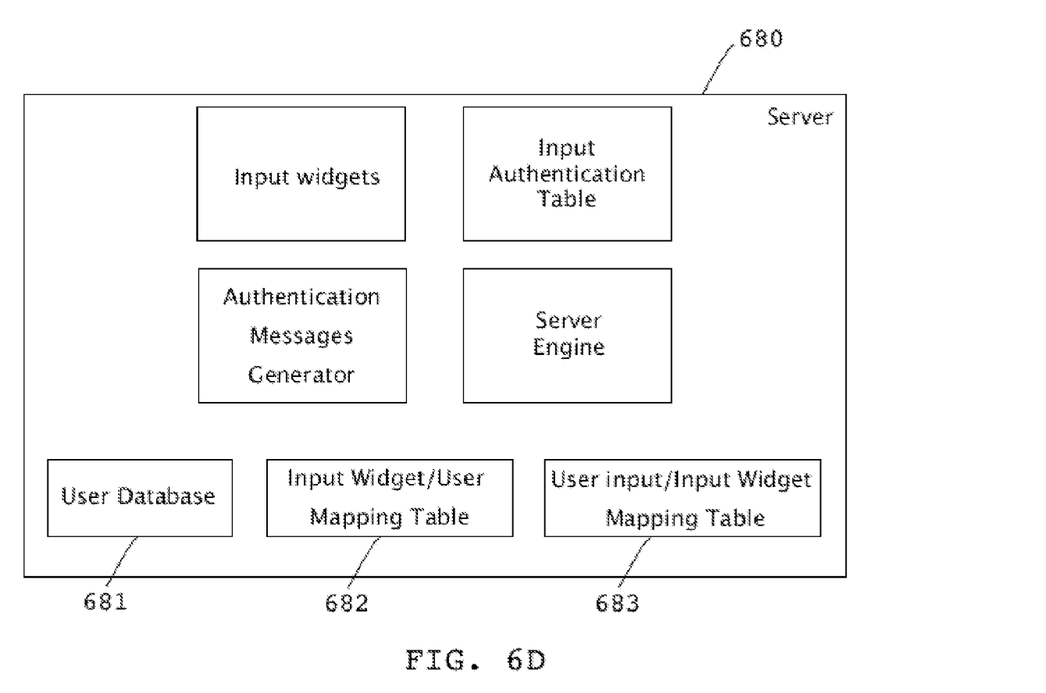
FIG. 6D is a block diagram illustrating an embodiment of server system supporting the embodiment of present invention illustrated in FIGS. 6A-6C.
Figure 7A:
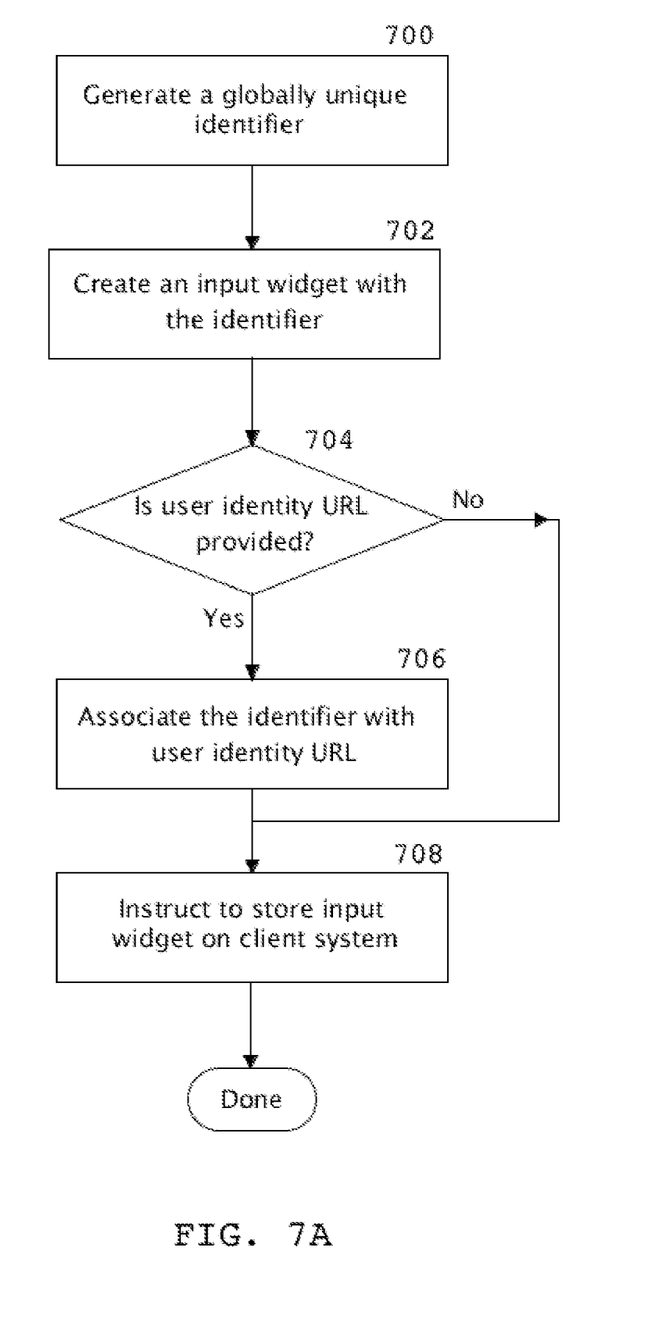
FIGS. 7A-7C are flow diagrams of routines that further illustrates the embodiment of present invention illustrated in FIGS. 6A-6D.
Figure 7B:
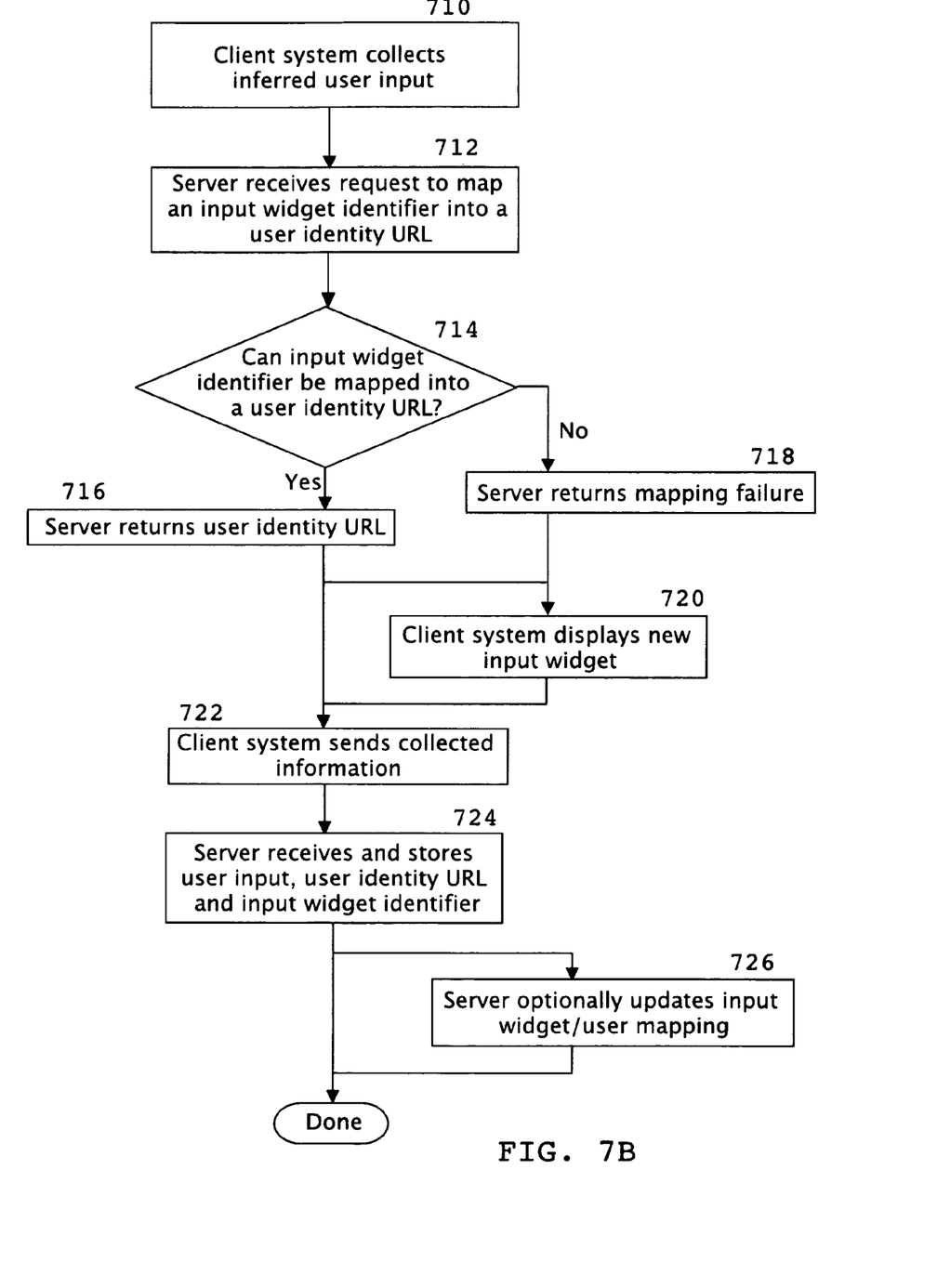
Figure 7C:
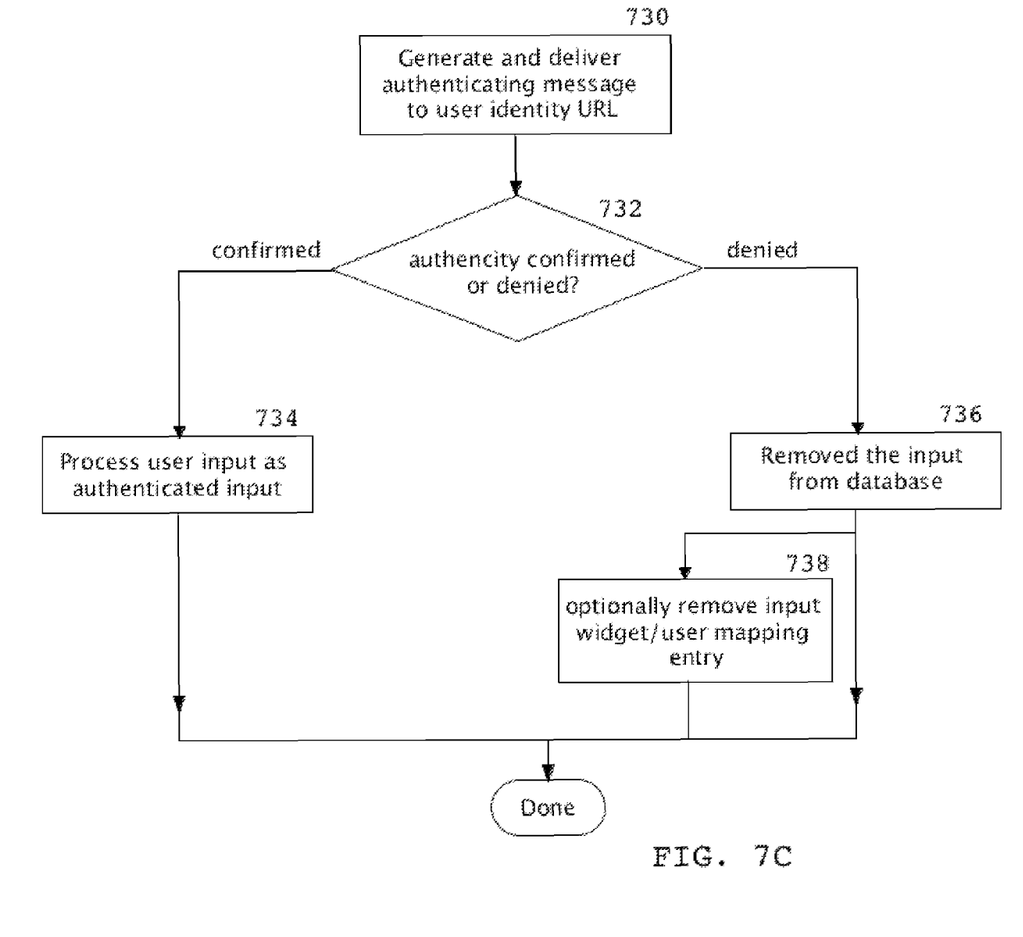

FIG. 6D is a block diagram illustrating an embodiment of server system supporting the embodiment of present invention illustrated in FIGS. 6A-6C. Besides including a server engine, input widgets, an input authentication table, and an authentication message generator as disclosed in one embodiment of the present invention illustrated in FIG. 2A, the server system 680 further includes a user database 681, an input widget/user mapping table 682, and a user input/input widget mapping table 683. The input widget/user mapping table 682 uniquely maps an input widget to a unique user identity URL by establishing a many-to-one database relationship. The user input/input widget mapping table 683 keeps record of the initiating source (that is, the identifier of an input widget stored in a client system) of a user input, and uniquely maps a user input to a unique input widget identifier by establishing a many-to-one database relationship FIGS. 7A-7C are flow diagrams of routines that further illustrates the embodiment of present invention illustrated in FIGS. 6A-6D. FIG. 7A is a flow diagram illustrating a routine to create and store a uniquely identified input widget on a client system. In step 700, the server system generates a globally unique identifier. In step 702, the server system creates an input widget that can be stored on a client system (e.g., a bookmarklet in FIG. 6A) and assigns the generated globally unique identifier to the input widget. In step 704, if a user identity URL is provided or known to the server system at the time of creating the input widget (e.g., the user has had an account with the server system and is currently logged in), the server system continues at step 706, else it continues at step 708. In step 706, the server system associates the input widget identifier with the user identity URL such that an input widget identifier can be mapped to a unique user identity URL (e.g., by creating a new entry in an input widget/user mapping table). In step 708, the server system provides the input widget to the client system, and instructs a user to store the input widget on the client system (e.g., drag and drop the input widget onto the bookmarks bar of the browser). The input widget identifier is stored on the client system as part of the input widget (e.g. as part of the bookmarklet's URL destination field). Once the input widget is stored on the client system, there will be no need to send new requests for provision of this input widget from the server system every time a user is to use it.

FIG. 7B is represents the input collecting stage of a routine of accepting user input using asynchronous authentication according to one embodiment of the present invention. This stage starts when a user perform a click or selection on the input widget that is stored on the client system. In step 710, the client system collects the inferred user input as defined by the function of the stored input widget (e.g., to record the URL information of the web page currently being viewed). The client system also sends a request containing the input widget identifier information to the server, requesting to derive user identity URL information that is associated with the input widget identifier. In step 712, in response to the request, the server system looks up the input widget/user mapping table using the input widget identifier information. In step 714, if the server system successfully derives a unique user identity URL from the input widget identifier, it continues at step 716, else it continues at step 718. In step 716, the server system sends a message preferably containing the derived user identity URL information back to the client system, indicating a successful mapping. In one embodiment, after step 716, the routine continues at step 720. In an alternative embodiment, after step 716, the routine immediately continues at step 722. In step 718, the server system sends a message to the client system, indicating a failure to derive a user identity URL. In step 720, the client system is instructed to display a new input widget containing at least a text field for entering user identity URL and an indication of action that the user is to perform to send the user identity URL and user input including the inferred user input information to the server system. If a user identity URL was successfully derived in a prior step, the text field for entering user identity may be pre-populated with the value of the derived user identity URL. The new input widget may further include additional input fields to collect additional information. In step 722, the client system sends the collected information including the inferred user input, user identity URL and the stored input widget identifier to the server system. In step 724, the server system receives the information. And if the user identity URL is not included in the information due to the known fact of successful input widget/user mapping in the prior steps, the server system will derive the user identity URL from the input widget identifier according to the input widget/user mapping table. The server system then stores the user input, user identity URL and the input widget identifier information. The server system also associates the user input with the user identity URL. The server system may further associate the user input with the input widget identifier by creating a new entry in the input/input widget mapping table. It now completes the routine. In an alternative embodiment, the server continues at step 726 and then completes. In step 726, the server updates the input widget/user mapping table according to the input widget identifier and the user identity URL that were received.

FIG. 7C represents the authenticating stage of a routine of accepting user input using asynchronous authentication according to one embodiment of the present invention. In step 730, the server system generates and delivers authenticating message to a user identity URL for a user to verify the authenticity of a user input. In step 732, if the user confirms the authenticity of the user input, the server system continues at step 734, else if the user denies the input authenticity, that is, the user regards the input should not be associated with the user identity URL, the server system continues at step 736. In step 734, the server system receives the confirmation and continues to process the user input as authenticated input then completes. In step 736, the server system receives the denial and removes the user input from the database. In one embodiment, it completes immediately after step 736. In an alternative embodiment, the server continues at step 738 after step 736 then completes. In step 738, since the user denies the authenticity of the user input, the server system may deem that the user input initiating source (that is, the identifier of the input widget stored on the client system) should not be associated with the user. The server system may then remove from the input widget/user mapping table the mapping entry that maps the input widget identifier to the user identity URL.

What is claimed is:

1. A method to accept a user input, comprising:
generating a globally unique identifier, the globally unique identifier being associated with a user identifier that uniquely identify a user;
creating a first means of action, the first means of action being assigned the globally unique identifier;
storing the first means of action and the globally unique identifier on a client system;
upon the user performing on the first means of action, determining the user identifier by mapping the globally unique identifier to the user identifier, and causing a display of a second means of action to collect the user input, the second means of action to collect the user input including at least a field for collecting user identifier, the field being pre-populated with the user identifier if the user identifier is determined from the globally unique identifier;
upon the user performing on the second means of action to collect the user input, initiating a request to accept the user input over a network, the request to accept the user input including the a main information body and the identifier;
receiving the request to accept the user input over a network;
storing the main information body and the user identifier, the main information body being associated with the user identifier;
generating a message including at least part of the main information body and an indication of action for the user to perform to verify the user input;
causing a display of the message to the user; and
accepting the user input when the indication of action for the user to perform to verify the user input is performed.

2. The method of claim 1, wherein said user identifier is an email address and said causing the display of the message to the user comprises sending the message to the email address.

3. The method of claim 1, wherein said user identifier is an account identifier with a server system and said causing the display of the message to the user comprises adding the message to the account's message queue.

4. The method of claim 1, wherein said accepting the user input comprises adding the main body information to a web page.

5. The method of claim 1, wherein said accepting the user input comprises causing a display of the main body information in a mobile application.

* * * * *